(12) United States Patent
Barber et al.

(10) Patent No.: US 11,892,543 B2
(45) Date of Patent: Feb. 6, 2024

(54) SYSTEMS AND METHODS FOR IQ DETECTION

(71) Applicant: Aurora Innovation, Inc., Palo Alto, CA (US)

(72) Inventors: Zeb Barber, Bozeman, MT (US); Stephen Crouch, Bozeman, MT (US); Emil Kadlec, Bozeman, MT (US)

(73) Assignee: AURORA INNOVATION, INC., Palo Alto, CA (US)

( * ) Notice: Subject to any disclaimer, the term of this patent is extended or adjusted under 35 U.S.C. 154(b) by 177 days.

(21) Appl. No.: 17/196,002

(22) Filed: Mar. 9, 2021

(65) Prior Publication Data
US 2021/0405202 A1 Dec. 30, 2021

Related U.S. Application Data

(63) Continuation of application No. 16/915,404, filed on Jun. 29, 2020, now Pat. No. 10,948,600.

(51) Int. Cl.
*G01S 17/931* (2020.01)
*G01S 17/34* (2020.01)
(Continued)

(52) U.S. Cl.
CPC .......... *G01S 17/931* (2020.01); *G01S 7/4814* (2013.01); *G01S 7/4912* (2013.01); *G01S 17/34* (2020.01);
(Continued)

(58) Field of Classification Search
None
See application file for complete search history.

(56) References Cited

U.S. PATENT DOCUMENTS 6,559,932 B1   5/2003   Halmos
7,440,102 B1   10/2008  Videen
(Continued)

FOREIGN PATENT DOCUMENTS

CN   105026970   11/2015
EP   2929382     5/2018
(Continued)

OTHER PUBLICATIONS

Martin, Aude, et al. "Photonic integrated circuit-based FMCW coherent LiDAR." Journal of Lightwave Technology 36.19 (2018): 4640-4645. (Year: 2018).*

(Continued)

*Primary Examiner* — Luke D Ratcliffe
(74) *Attorney, Agent, or Firm* — Dority & Manning, P.A.

(57) ABSTRACT

A system and method for combining multiple functions of a light detection and ranging (LIDAR) system includes receiving a second optical beam generated by the laser source or a second laser source, wherein the second optical beam is associated with a second local oscillator (LO); splitting the second optical beam into a third split optical beam and a fourth split optical beam; transmitting, to the optical device, the third split optical beam and the fourth split optical beam; receiving, from the optical device, a third reflected beam that is associated with the third split optical beam and a fourth reflected beam that is associated with the fourth split optical beam; and pairing the third reflected beam with the second LO signal and the fourth reflected beam with the second LO signal.

20 Claims, 8 Drawing Sheets

(51) Int. Cl.
*G01S 7/481* (2006.01)
*G05D 1/00* (2006.01)
*G01S 7/4912* (2020.01)
*G05D 1/02* (2020.01)

(52) U.S. Cl.
CPC ......... *G05D 1/0088* (2013.01); *G05D 1/0223* (2013.01); *G05D 2201/0213* (2013.01)

(56) References Cited

U.S. PATENT DOCUMENTS

| | | |
|---|---|---|
| 8,988,754 B2 | 3/2015 | Sun et al. |
| 9,316,534 B1 | 4/2016 | Kondratko et al. |
| 9,476,981 B2 | 10/2016 | Yaacobi et al. |
| 10,338,321 B2 | 7/2019 | Hosseini et al. |
| 10,627,517 B2 | 4/2020 | Yaacobi et al. |
| 10,754,091 B1 | 8/2020 | Nagarajan |
| 10,761,272 B2 | 9/2020 | Hosseini et al. |
| 10,948,600 B1 | 3/2021 | Barber et al. |
| 11,150,411 B2 | 10/2021 | Hosseini et al. |
| 11,372,106 B2 | 6/2022 | Yaacobi et al. |
| 2017/0299697 A1 | 10/2017 | Swanson |
| 2018/0267250 A1 | 9/2018 | Hosseini et al. |
| 2019/0154810 A1 | 5/2019 | Tanemura et al. |
| 2019/0154832 A1 | 5/2019 | Maleki et al. |
| 2019/0310368 A1 | 10/2019 | Lachapelle |
| 2019/0339389 A1 | 11/2019 | Russo et al. |
| 2019/0391243 A1 | 12/2019 | Nicolaescu |
| 2020/0088876 A1 | 3/2020 | Tanemura et al. |
| 2020/0150251 A1 | 5/2020 | Crouch et al. |
| 2020/0158834 A1 | 5/2020 | Han et al. |
| 2020/0166617 A1 | 5/2020 | Crouch et al. |
| 2020/0174124 A1 | 6/2020 | Raring et al. |
| 2020/0200881 A1* | 6/2020 | Maier ................ G01S 7/4914 |
| 2020/0292745 A1 | 9/2020 | Waldern et al. |
| 2021/0055391 A1 | 2/2021 | LaChapelle et al. |
| 2021/0055694 A1 | 2/2021 | Chan et al. |
| 2021/0141058 A1 | 5/2021 | Piggott et al. |
| 2021/0181309 A1 | 6/2021 | Oza et al. |
| 2021/0181320 A1 | 6/2021 | Oza et al. |
| 2021/0405203 A1 | 12/2021 | Barber et al. |
| 2022/0003937 A1 | 1/2022 | Hosseini et al. |

FOREIGN PATENT DOCUMENTS

| | | |
|---|---|---|
| JP | 2010127918 A | 6/2010 |
| JP | 2020503530 A | 1/2017 |
| JP | 6363619 | 7/2018 |
| JP | 2020510882 A | 4/2020 |
| KR | 102181537 | 11/2020 |
| KR | 102350191 | 1/2022 |
| WO | WO 2015044370 A1 | 4/2015 |
| WO | WO-2018/107237 A1 | 6/2018 |

OTHER PUBLICATIONS

International Preliminary Report on Patentability, PCT Application PCT/US2021/035683, dated Sep. 17, 2021, 6 pages.
Non-Final Office Action, U.S. Appl. No. 17/228,339, dated Nov. 23, 2021, 13 pages.
Notice of Allowance, U.S. Appl. No. 16/915,404, dated Nov. 12, 2020, 5 pages.
Notice of Allowance, U.S. Appl. No. 17/228,346, dated Nov. 18, 2021, 6 pages.
Office Action, U.S. Appl. No. 16/915,404, dated Aug. 25, 2020, 5 pages.
Office Action, U.S. Appl. No. 17/228,339, dated Jul. 27, 2021, 12 pages.
Office Action, U.S. Appl. No. 17/228,346, dated Jul. 13, 2021, 11 pages.
U.S. Appl. No. 17/228,339, filed Apr. 12, 2021, 70 pages.
U.S. Appl. No. 17/228,346, filed Apr. 12, 2021, 69 pages.
U.S. Appl. No. 17/531,029, filed Nov. 19, 2021, 45 pages.
U.S. Appl. No. 17/542,459, filed Dec. 5, 2021, 46 pages.
U.S. Appl. No. 17/558,476, filed Dec. 21, 2021, 61 pages.
U.S. Appl. No. 17/674,537, filed Feb. 17, 2022, 69 pages.
U.S. Appl. No. 17/750,247, filed May 20, 2022, 64 pages.
U.S. Appl. No. 18/160,817, filed Jan. 27, 2023, 70 pages.
U.S. Appl. No. 18/161,441, filed Jan. 30, 2023, 70 pages.
International Search Report and Written Opinion on Appl. Ser. No. PCT/US2021/035683 dated Sep. 17, 2021 (8 pages).
Extended European Search Report for Application No. 21834509.8, dated Aug. 2, 2023, 9 pages.

\* cited by examiner

SYSTEMS AND METHODS FOR IQ DETECTION

CROSS-REFERENCE TO RELATED APPLICATION

The present application is a Continuation of U.S. patent application Ser. No. 16/915,404, filed Jun. 29, 2020. The entire disclosure of U.S. patent application Ser. No. 16/915,404 is incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and methods for combining multiple functions of a LIDAR system, to support the operation of a vehicle.

One implementations disclosed here is directed to a LIDAR system. The LIDAR system includes one or more optical components configured to receive an optical beam generated by a laser source, wherein the optical beam is associated with a local oscillator (LO) signal. In some implementations, the one or more optical components configured to split the optical beam into a first split optical beam and a second split optical beam. In some implementations, the one or more optical components configured to transmit, to an optical device, the first split optical beam and the second split optical beam. In some implementations, the one or more optical components configured to receive, from the optical device, a first reflected beam that is associated with the first split optical beam and a second reflected beam that is associated with the second split optical beam. In some implementations, the one or more optical components configured to pair the first reflected beam with the LO signal and the second reflected beam with the LO signal.

In another aspect, the present disclosure is directed to a method of combining multiple functions of a light detection and ranging (LIDAR) system. In some implementations, the method includes receiving an optical beam generated by a laser source, wherein the optical beam is associated with a local oscillator (LO) signal. In some implementations, the method includes splitting the optical beam into a first split optical beam and a second split optical beam. In some implementations, the method includes transmitting, to an optical device, the first split optical beam and the second split optical beam. In some implementations, the method includes receiving, from the optical device, a first reflected beam that is associated with the first split optical beam and a second reflected beam that is associated with the second split optical beam. In some implementations, the method includes pairing the first reflected beam with the LO signal and the second reflected beam with the LO signal.

Still other aspects, features, and advantages are readily apparent from the following detailed description, simply by illustrating a number of particular implementations, including the best mode contemplated for carrying out the invention. Other implementations are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

Implementations are illustrated by way of example, and not by way of limitation, in the figures of the accompanying drawings in which like reference numerals refer to similar elements and in which.

DETAILED DESCRIPTION

Figure 1A:
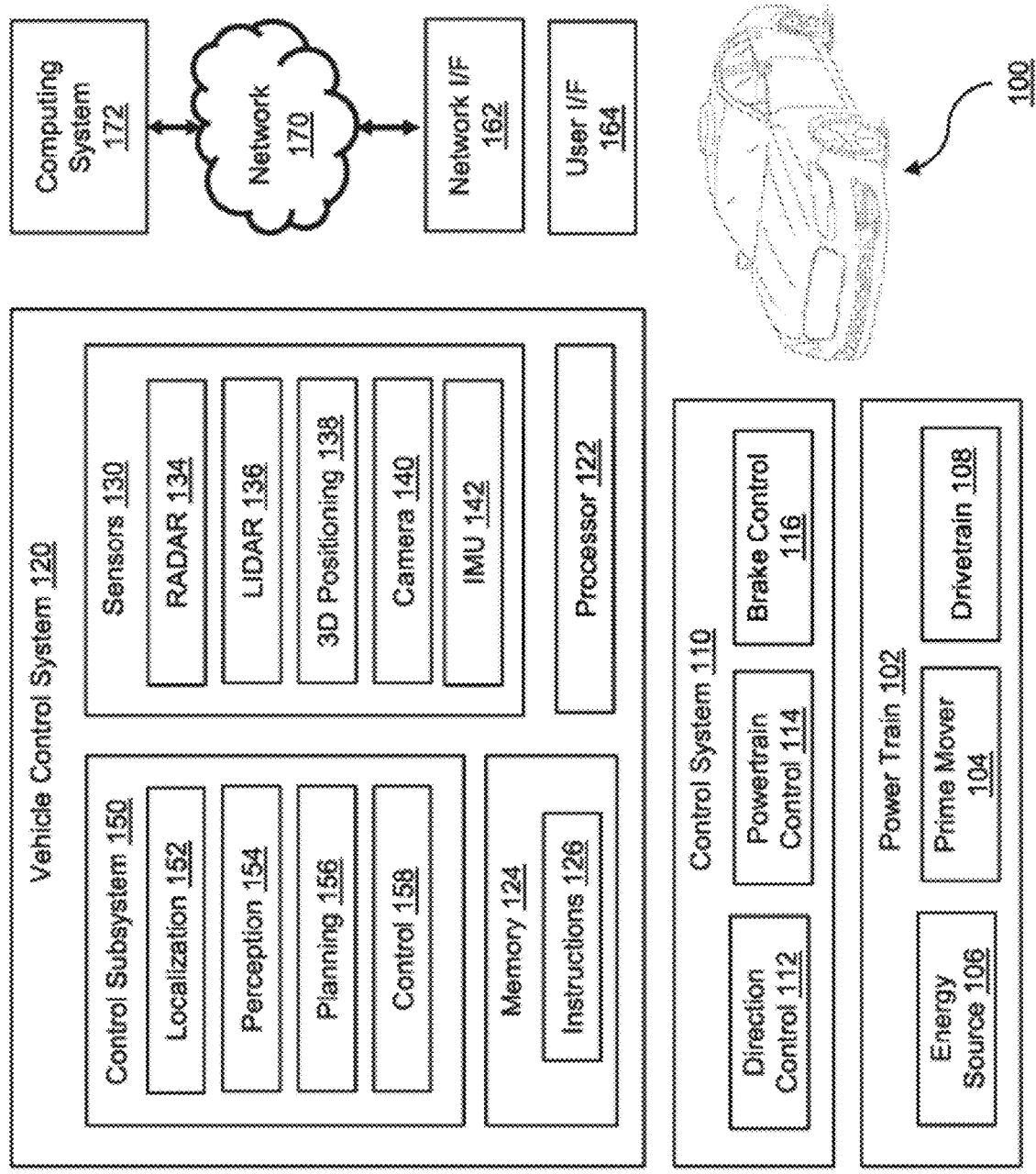
FIG. 1A is a block diagram illustrating an example of a system environment for autonomous vehicles according to some implementations.

A LIDAR system may include a transmit (Tx) path and a receive (Rx) path. The transmit (Tx) path may include a laser source for providing a light signal (sometimes referred to as, "beam") that is derived from (or associated with) a local oscillator (LO) signal, one or more modulators for modulating a phase and/or a frequency of the light signal using Continuous Wave (CW) modulation or quasi-CW modulation, and an amplifier for amplifying the modulated signal before sending the signal to optics (e.g., an oscillatory scanner, a unidirectional scanner, a Risley prism, a circulator optic, and/or a beam collimator, etc.).

The optics are configured to steer the amplified signal that it receives from the Tx path into an environment within a given field of view toward an object, receive a returned signal reflected back from the object, and provide the returned signal to the receive (RX) path.

The receive (Rx) path may include a mixer (e.g., 50/50) for mixing the LO signal with the returned signal to generate a down-converted signal, and a transimpedance (TIA)

amplifier for amplifying the down-converted signal. The RX path provides the down-converted signal (now amplified) to an autonomous vehicle control system for determining a distance to the object and/or measuring the velocity of the object.

In conventional LIDAR systems, fiber coupling (sometimes referred to as, "fiber cable") is used to interconnect the Tx path, the Rx path, and the optics. The fiber coupling provides flexibility during testing and development of the LIDAR system in that it allows different channels to be used with different Tx/Rx apertures and optical circulation methods.

However, the bulkiness of fiber coupling limits the capability for a LIDAR designer to add additional channels—each requiring even more fiber coupling—and/or to scale the LIDAR system down to the dimensions required for efficient, automotive applications.

Accordingly, the present disclosure is directed to systems and methods for combining multiple functions (e.g., splitting, collecting, combining, redirecting, pairing, etc.) of a LIDAR system, to support the operation of a vehicle.

In general, as described in the below passages, a Tx path of a multi-channel coherent LIDAR transceiver may receive (via Tx inputs) an optical beam from a laser source. The laser source may generate the optical beam based on an LO signal. The Tx path of the coherent LIDAR transceiver may split (e.g., multiply, duplicate, reproduce, etc.) the optical beam into multiple paths and provide emission of the optical beams into free space (via Tx outputs) toward one or more objects. An Rx path of the multi-channel coherent LIDAR transceiver may receive (via Rx inputs) the returned light that is reflected back from the one or more objects into Rx waveguides. Each of the Rx waveguides may be paired with a respective Tx output of the Tx path. The Rx path may split the LO signal into multiple LO signals, which are then combined with the returned light from the Rx waveguides using splitters (e.g., 50/50). The Rx path may provide (via Rx outputs) the combined signals to one or more detectors.

Various example implementations described herein may include one or more of the following features: (1) the Tx and LO inputs of the coherent LIDAR transceiver may be divided into two inputs each, which may improve matching with a LIDAR engine architecture; (2) the Tx/Rx outputs to free space may occur along one edge of the coherent LIDAR transceiver with waveguides interleaving the Tx/Rx outputs (e.g., Tx-Rx-Tx-Rx, etc.), where the pitch is defined by the requirements of the free space circulation and/or beam collimation optics; (3) the LO and Tx inputs may be paired (e.g., LO_A, LO_B; Tx_A, Tx_B, etc.) to function as independent subsystems; (4) the input power levels to the Tx inputs may be large (e.g., >1 Watt each); (5) the fiber to the coherent LIDAR transceiver input coupling may accept high power; (6) the scattering of the Tx paths (sometimes referred to as, "directivity") into the Rx paths (e.g., toward the detector) may be very small while being interleaved; (7) reflections from the output faces maybe minimized (e.g., an Angled polish of the coherent LIDAR transceiver may be used); (8) as the output beam quality may be defined by the output of the waveguide, the output mode of the coherent LIDAR transceiver must have high quality (e.g., a low distortion from a transverse electromagnetic (TEM00) beam); (9) the functions (e.g., splitting, collecting, combining, redirecting, pairing, etc.) of a LIDAR system may be combined into one integrated photonic device; and (10) the coherent LIDAR transceiver may be implemented using a programmable logic controller (PLC).

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. System Environment for Autonomous Vehicles

FIG. 1A is a block diagram illustrating an example of a system environment for autonomous vehicles according to some implementations.

Referring to FIG. 1A, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 2:
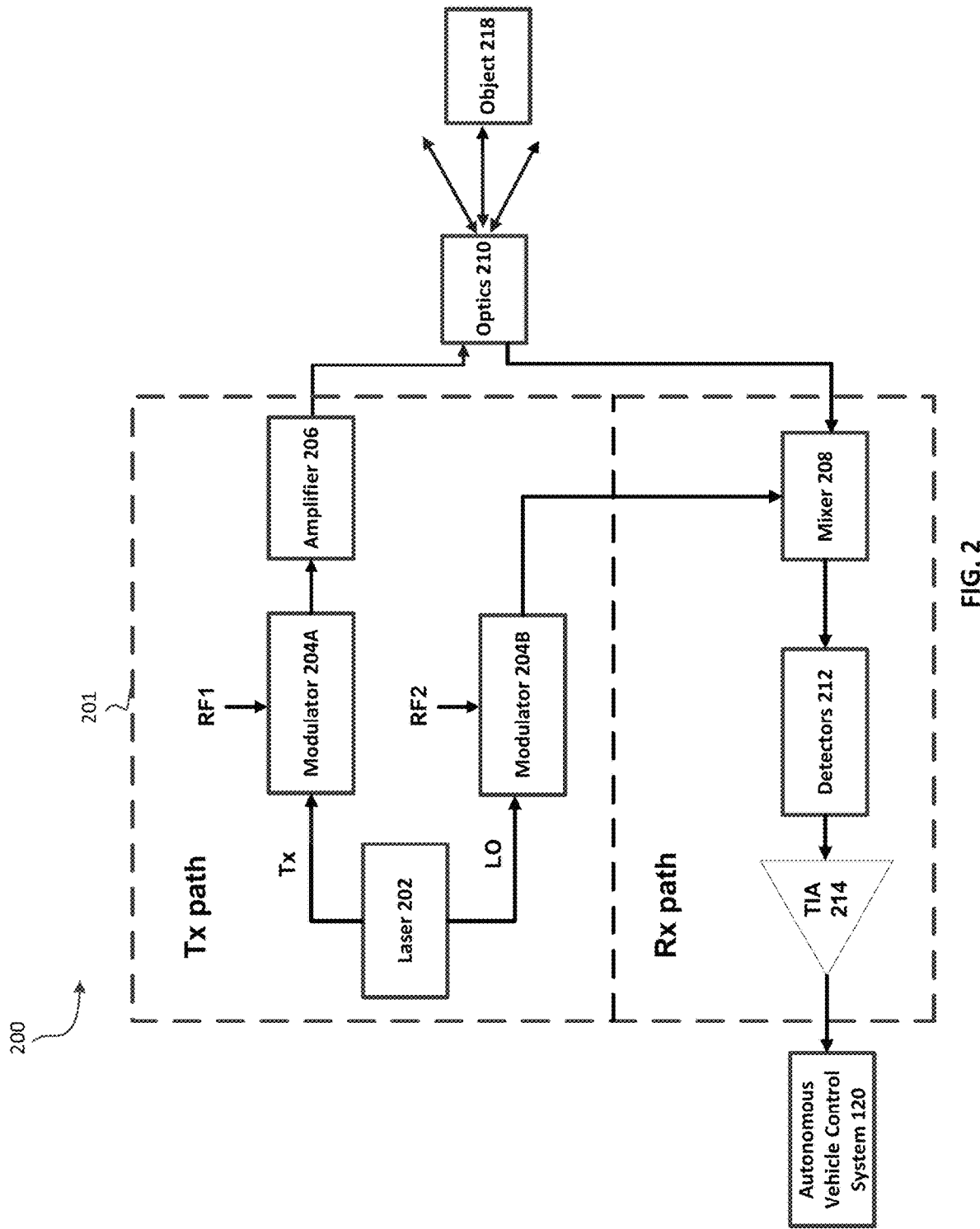
FIG. 2 is a block diagram illustrating an example environment of a LIDAR system for autonomous vehicles, according to some implementations.

A truck can include a LIDAR system (e.g., vehicle control system 120 in FIG. 1A, LIDAR system 201 in FIG. 2, etc.). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it has less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
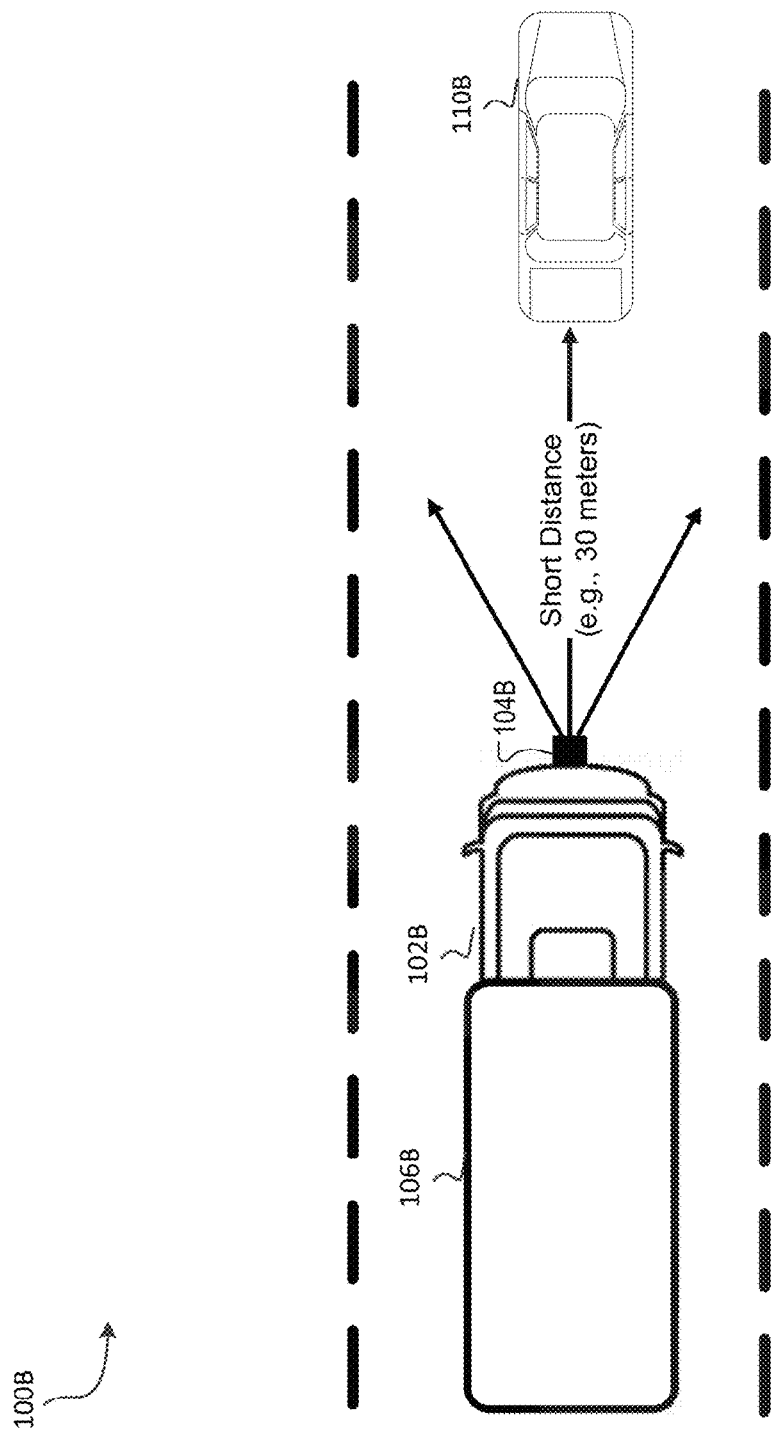
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 201 in FIG. 2, etc.) for determining a distance to the object 110B and/or measuring the velocity of the object 110B. Although FIG. 1B shows that one LIDAR system 104B is mounted on the front of the commercial truck 102B, the number of LIAR system and the mounting area of the LIAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
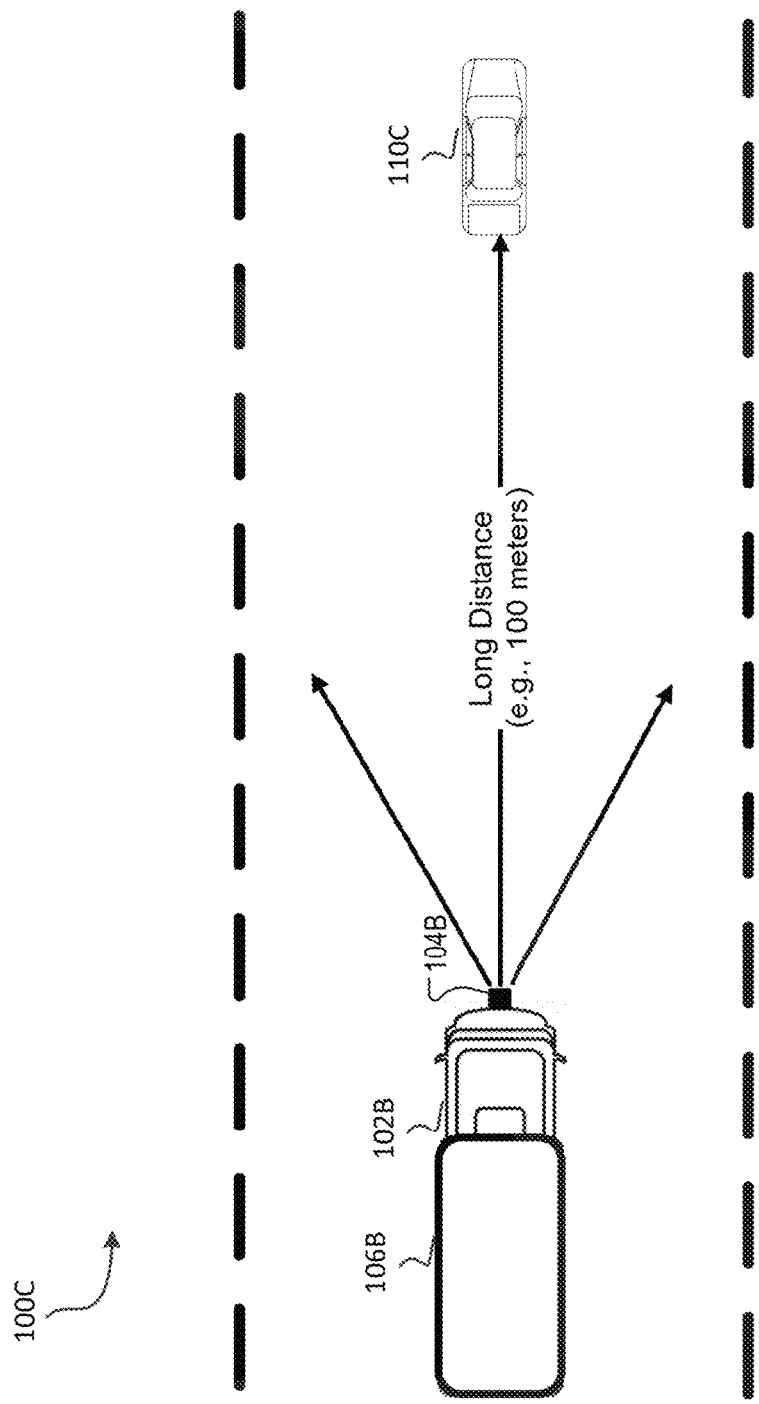
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 1D:
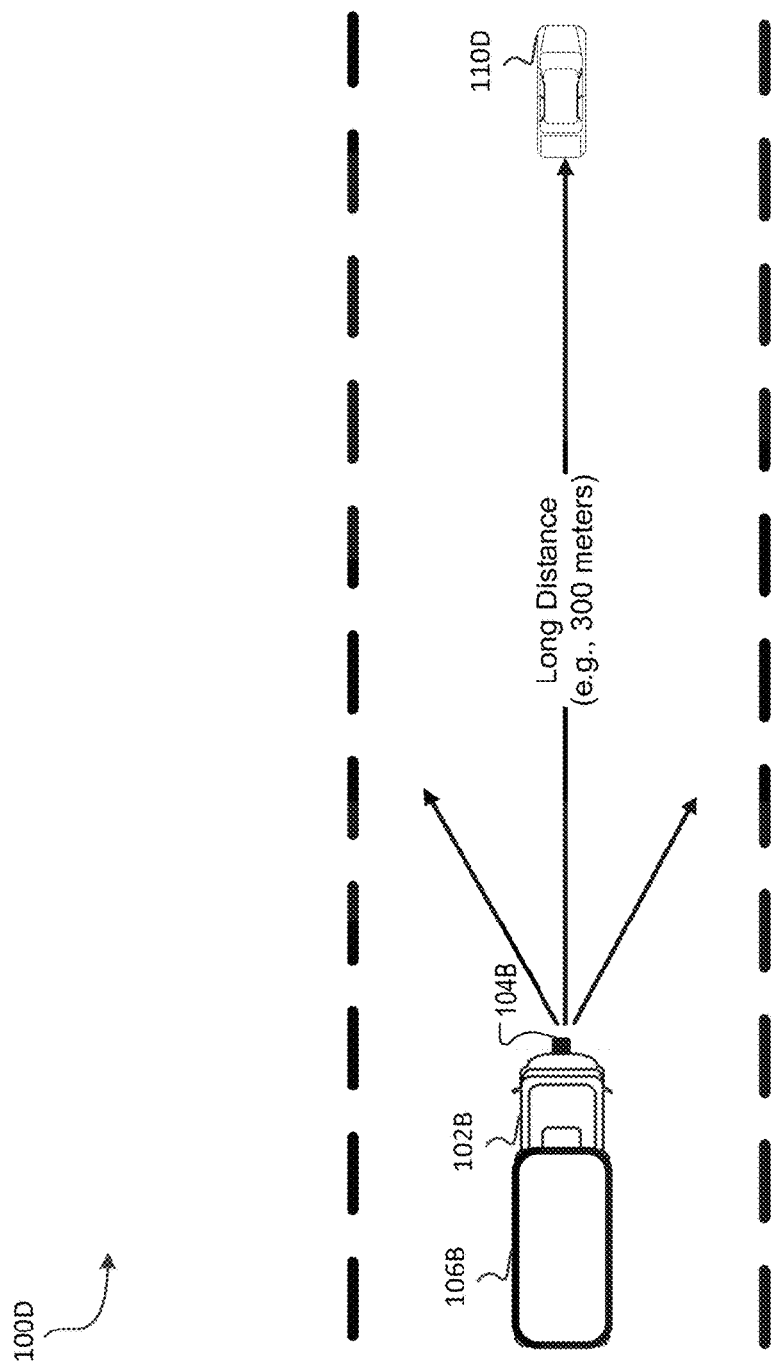
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. Continuous Wave Modulation and Quasi-Continuous Wave Modulation

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

4. A Coherent LIDAR Transceiver with Multiple Channels

FIG. 2 is a block diagram illustrating an example environment of a LIDAR system for autonomous vehicles, according to some implementations. The environment 200 includes a LIDAR system 201 that includes a transmit (Tx) path and a receive (Rx) path. The Tx path includes one or more Tx input/output ports (not shown in FIG. 2) and the Rx path includes one or more Rx input/output ports (not shown in FIG. 2).

In some implementations, a semiconductor substrate and/or semiconductor package may include the Tx path and the Rx. In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur along one or more edges of one or more semiconductor substrates and/or semiconductor packages.

The environment 200 includes one or more optics 210 (e.g., an oscillatory scanner, a unidirectional scanner, a Risley prism, a circulator optic, and/or a beam collimator, etc.) that are coupled to the LIDAR system 201. In some implementations, the one or more optics 210 may be coupled to the Tx path via the one or more Tx input/output ports. In some implementations, the one or more optics 210 may be coupled to the Rx path via the one or more Rx input/output ports.

The environment 200 includes a vehicle control system 120 (e.g., vehicle control system 120 in FIG. 1) that is coupled to the LIDAR system 201. In some implementations, the vehicle control system 120 may be coupled to the Rx path via the one or more Rx input/output ports.

The Tx path includes a laser source 202, a modulator 204A, a modulator 204B, and an amplifier 206. The Rx path includes a mixer 208, a detector 212, and a transimpedance (TIA) 212. Although FIG. 2 shows only a select number of components and only one input/output channel; the environment 200 may include any number of components and/or input/output channels (in any combination) that are interconnected in any arrangement to facilitate combining multiple functions of a LIDAR system, to support the operation of a vehicle.

The laser source 202 is configured to generate a light signal that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1600 nanometers.

The laser source 202 is configured to provide the light signal to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A is configured to send the modulated light signal to the amplifier 206. The amplifier 206 is configured to amplify the modulated light signal to generate an amplified light signal to the optics 210.

The optics 210 are configured to steer the amplified light signal that it receives from the Tx path into an environment within a given field of view toward an object 218, receive a returned signal reflected back from the object 218, and provide the returned signal to the mixer 208 of the Rx path.

The laser source 202 is configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 is configured to mix (e.g., combine, multiply, etc.) the modulated LO signal with the returned signal to generate a down-converted signal and send the down-converted signal to the detector 212. In some arrangements, the mixer 208 is configured to send the modulated LO signal to the detector 212.

The detector 212 is configured to generate an electrical signal based on the down-converted signal and send the electrical signal to the TIA 214. In some arrangements, the detector 212 is configured to generate an electrical signal based on the down-converted signal and the modulated signal.

The TIA 214 is configured to amplify the electrical signal and send the amplified electrical signal to the vehicle control system 120.

In some implementations, the TIA 214 may have a peak noise-equivalent power (NEP) that is less than 5 picoWatts per square root Hertz (i.e., $5 \times 10^{-12}$ Watts per square root Hertz). In some implementations, the TIA 214 may have a gain between 4 kiloohms and 25 kiloohms In some implementations, detector 212 and/or TIA 214 may have a 3 decibel bandwidth between 80 kilohertz (kHz) and 650 megahertz (MHz).

The vehicle control system 120 is configured to determine a distance to the object 218 and/or measures the velocity of the object 218 based on the one or more electrical signals that it receives from the TIA.

In some implementations, modulator 204A and/or modulator 204B may have a bandwidth between 600 megahertz (MHz) and 1000 (MHz).

Figure 3:
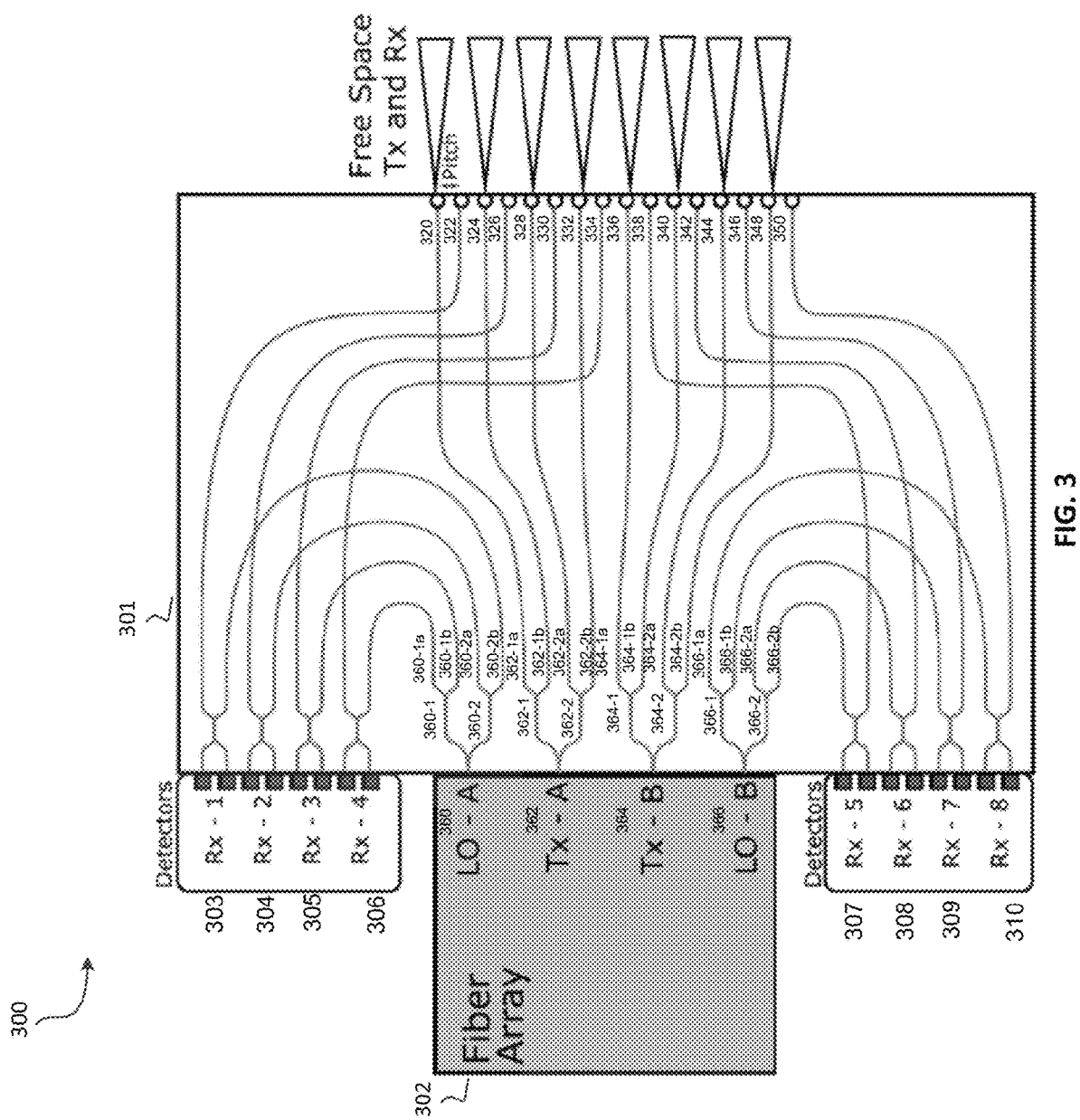
FIG. 3 is a block diagram depicting an example coherent LIDAR transceiver for operating of a vehicle, according to some implementations.

FIG. 3 is a block diagram depicting an example coherent LIDAR transceiver for operating of a vehicle, according to some implementations. The environment 300 includes a coherent LIDAR transceiver 301 and detectors 303, 304, 305, 306, 307, 308, 309, 310 (collectively referred to as, "detectors 303-310"). A laser source (e.g., laser source 202 in FIG. 2) generates an LO signal via a Tx path (e.g., the Tx path in FIG. 2) and provides the LO signal (modulated or unmodulated) to an LO input 360 (shown in FIG. 3 as, "LOA-A"). In some implementations, the LO signal at the LO input 360 is less than 5 milliwatts.

The coherent LIDAR transceiver 301 splits the LO signal received at the LO input 360 into LO signal 360-1 and LO signal 360-2. The coherent LIDAR transceiver 301 splits LO signal 360-1 into LO signal 360-1a and LO signal 360-1b. The coherent LIDAR transceiver 301 splits LO signal 360-2 into LO signal 360-2a and LO signal 360-2b.

The laser source provides the LO signal (modulated or unmodulated) to an LO input 366 (shown in FIG. 3 as, "LOA-B"). The coherent LIDAR transceiver 301 splits the LO signal received at the LO input 366 into LO signal 366-1 and LO signal 366-2. The coherent LIDAR transceiver 301 splits LO signal 366-1 into LO signal 366-1a and LO signal 366-1b. The coherent LIDAR transceiver 301 splits LO signal 366-2 into LO signal 366-2a and LO signal 366-2b.

The laser source generates a light signal via a Tx path (e.g., the Tx path in FIG. 2) and provides the light signal (modulated or unmodulated) to a Tx input 362 (shown in FIG. 3 as, "Tx-A"). The coherent LIDAR transceiver 301 splits the light signal received at the Tx input 362 into light signal 362-1 and light signal 362-2. The coherent LIDAR transceiver 301 splits light signal 362-1 into light signal 362-1a and light signal 362-1b. The coherent LIDAR transceiver 301 splits light signal 362-2 into light signal 362-2a and light signal 362-2b.

The laser source provides the light signal (modulated or unmodulated) to a Tx input 364 (shown in FIG. 3 as, "Tx-B"). The coherent LIDAR transceiver 301 splits the light signal received at the Tx input 364 into light signal 364-1 and light signal 364-2. The coherent LIDAR transceiver 301 splits light signal 364-1 into light signal 364-1a and light signal 364-1b. The coherent LIDAR transceiver 301 splits light signal 364-2 into light signal 364-2a and light signal 364-2b.

The coherent LIDAR transceiver 301 provides emission of the light signal 362-1a into free space toward one or more objects via Tx output 320, receives the returned light reflected back from an object via Rx input 322, and provides the returned light and LO signal 360-2b to detector 303 (shown in FIG. 3 as, "Rx-1"). The detector 303 generates an electrical signal based on the returned light and/or the LO signal 360-2b.

The coherent LIDAR transceiver 301 provides emission of the light signal 362-1b into free space toward one or more objects via Tx output 324, receives the returned light reflected back from an object via Rx input 326, and provides the returned light and LO signal 360-2a to detector 304 (shown in FIG. 3 as, "Rx-2"). The detector 304 generates an electrical signal based on the returned light and/or the LO signal 360-2a.

The coherent LIDAR transceiver 301 provides emission of the light signal 362-2a into free space toward one or more objects via Tx output 328, receives the returned light reflected back from an object via Rx input 330, and provides the returned light and LO signal 360-1b to detector 305 (shown in FIG. 3 as, "Rx-3"). The detector 305 generates an electrical signal based on the returned light and/or the LO signal 360-1b.

The coherent LIDAR transceiver 301 provides emission of the light signal 362-2b into free space toward one or more objects via Tx output 332, receives the returned light reflected back from an object via Rx input 334, and provides the returned light and LO signal 360-1a to detector 306 (shown in FIG. 3 as, "Rx-4"). The detector 306 generates an electrical signal based on the returned light and/or the LO signal 360-1a.

The coherent LIDAR transceiver 301 provides emission of the light signal 364-1a into free space toward one or more objects via Tx output 336, receives the returned light reflected back from an object via Rx input 338, and provides the returned light and LO signal 366-2b to detector 307 (shown in FIG. 3 as, "Rx-5"). The detector 307 generates an electrical signal based on the returned light and/or the LO signal 366-2b.

The coherent LIDAR transceiver 301 provides emission of the light signal 364-1b into free space toward one or more objects via Tx output 340, receives the returned light reflected back from an object via Rx input 342, and provides the returned light and LO signal 366-2a to detector 308 (shown in FIG. 3 as, "Rx-6"). The detector 308 generates an electrical signal based on the returned light and/or the LO signal 366-2a.

The coherent LIDAR transceiver 301 provides emission of the light signal 364-2a into free space toward one or more objects via Tx output 344, receives the returned light reflected back from an object via Rx input 346, and provides the returned light and LO signal 366-1b to detector 309 (shown in FIG. 3 as, "Rx-7"). The detector 309 generates an electrical signal based on the returned light and/or the LO signal 366-1b.

The coherent LIDAR transceiver 301 provides emission of the light signal 364-2b into free space toward one or more objects via Tx output 348, receives the returned light reflected back from an object via Rx input 350, and provides the returned light and LO signal 366-1a to detector 310 (shown in FIG. 3 as, "Rx-8"). The detector 310 generates an electrical signal based on the returned light and/or the LO signal 366-1a.

In some implementations, a signal crosstalk associated with returned light (sometimes referred to as, "reflected beam") reflected back from surfaces internal to the LIDAR sensor and the emission of the corresponding light signal (e.g., light signal 362-1a, 362-1b, 362-2a, 362-2b, 364-1a, 364-1b, 364-2a, 364-2b, etc.) is less than or equal to −55 decibels (dB) within 1 megahertz (MHz) and 200 MHz on all other channels relative to the channel for which the reflected beam is obtained.

In some implementations, a scattering of a light signal into its corresponding returned light that is reflected back from surfaces internal to the LIDAR sensor is less than or equal to −66 decibels (dB) relative to the transmitted Tx power, where the scattering is associated with a polarization that is maintained.

In some implementations, a scattering of a light signal into its corresponding returned light that is reflected back from surfaces internal to the LIDAR sensor is equal to or less than −84 decibels (dB) relative to the transmitted Tx power, where the scattering is associated with a polarization that is rotated 90 degrees.

In some implementations, a signal crosstalk between any of the electrical signals that are generated by detectors 303-310 is less than or equal to −55 decibels (dB) relative to the electrical signal generated on another detector within a frequency range of 1 megahertz (MHz) and 200 MHz.

In some implementations, one or more of the detectors 303-310 may include a pair of photodiodes. In some implementations, a pair of photodiodes within a detector may have a common mode rejection ratio (CMRR) greater than or equal to 30 decibels (dB).

In some implementations, any of detectors 303-310 may have a 3 decibel bandwidth between 80 kilohertz (kHz) and 650 megahertz (MHz).

In some implementations, one or more detectors 303-310 may have a responsivity greater than or equal to 0.9 amperes per watt (A/W).

In some implementations, any of the light signals (e.g., light signal 362-1a, 362-1b, 362-2a, 362-2b, 364-1a, 364-1b, 364-2a, 364-2b, etc.) may have a duty cycle that is equal to or less than 33 percent.

Figure 4:
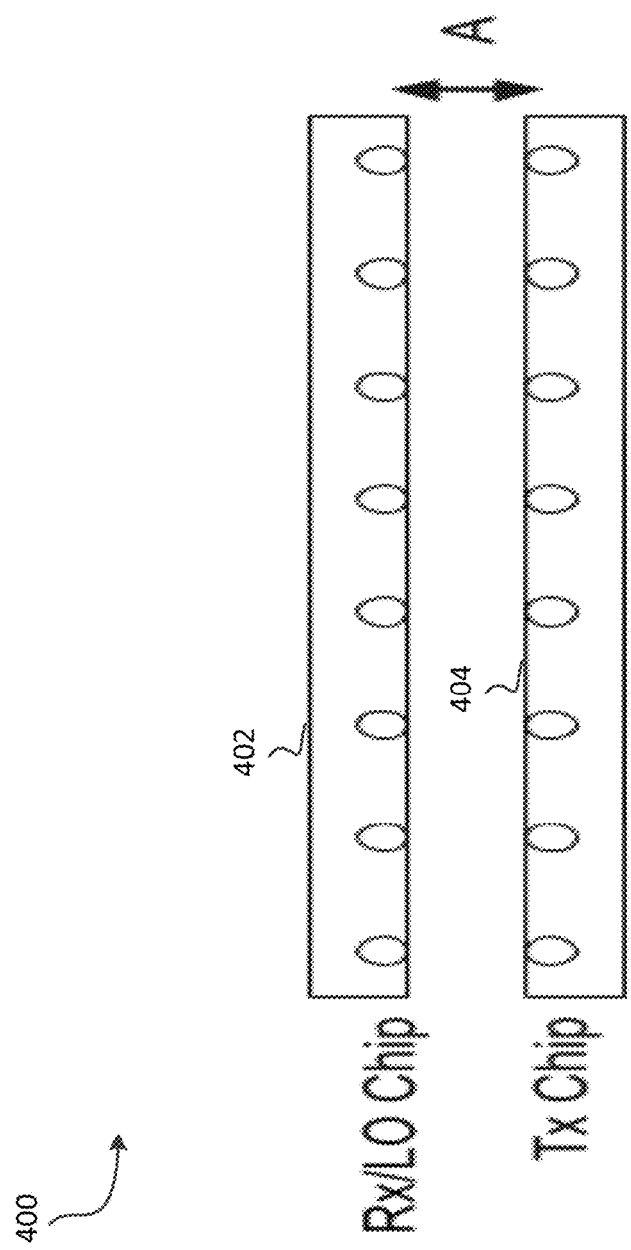
FIG. 4 is a block diagram depicting an example coherent LIDAR transceiver on two semiconductor substrates, according to some implementations.

FIG. 4 is a block diagram depicting an example coherent LIDAR transceiver on two semiconductor substrates, according to some implementations. The environment 400 includes a semiconductor substrate 402 that includes the Rx/LO paths and a semiconductor substrate 404 that includes the Tx paths. The semiconductor substrates 402 and 404 may be placed back-to-back with spacing 'A' close to the pitch (e.g., the distance between the centers of two inputs/outputs) in the single chip concept. In some implementations, the inputs/outputs of a semiconductor substrate each have a pitch that is between 31.75 micrometer and 381 micrometer.

Figure 5:
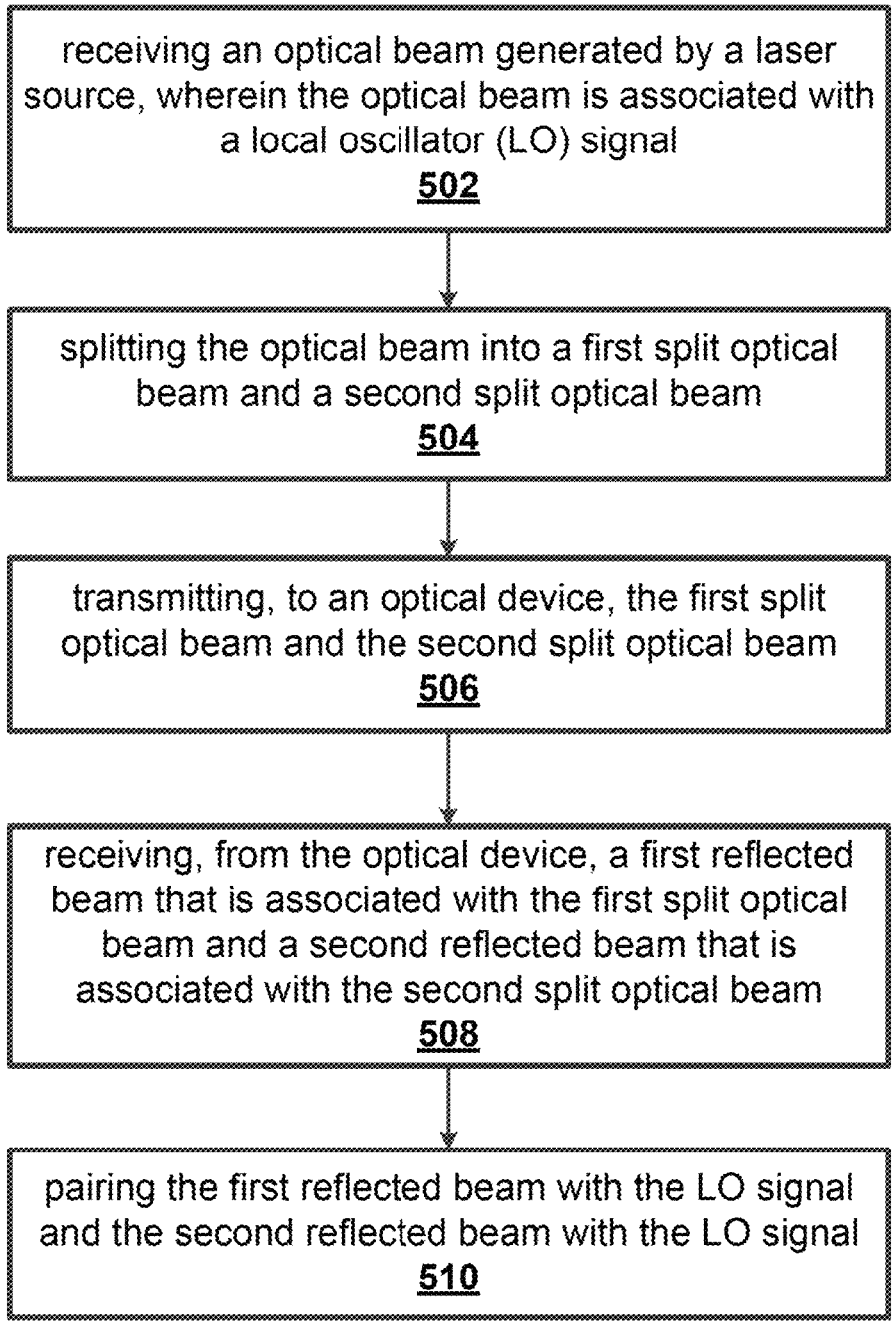
FIG. 5 is a flow chart that illustrates an example method for combining multiple functions of a LIDAR system, according to an implementation.

FIG. 5 is a flow chart that illustrates an example method for combining multiple functions of a LIDAR system, according to an implementation. Although steps are depicted in FIG. 5 as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementation, some or all operations of method 500 may be performed by the coherent LIDAR transceiver 301 in FIG.

The method 500 includes the operation 502 of receiving an optical beam generated by a laser source. In some implementations, the optical beam is associated with a local oscillator (LO) signal. The method 500 includes the operation 504 of splitting the optical beam into a first split optical beam and a second split optical beam. The method 500 includes the operation 506 of transmitting, to an optical device, the first split optical beam and the second split optical beam. The method 500 includes the operation 508 of receiving, from the optical device, a first reflected beam that is associated with the first split optical beam and a second reflected beam that is associated with the second split optical beam. The method 500 includes the operation 510 of pairing the first reflected beam with the LO signal and the second reflected beam with the LO signal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10 (e.g., 1 to 4).

Some implementations of the present disclosure are described below in the context of one or more hi-res Doppler LIDAR systems that are mounted onto an area (e.g., front, back, side, top, and/or bottom) of a personal automobile; but, implementations are not limited to this context. In other implementations, one or multiple systems of the same type or other high resolution LIDAR, with or without Doppler components, with overlapping or non-overlapping fields of view or one or more such systems mounted on smaller or larger land, sea or air vehicles, piloted or autonomous, are employed. In other implementations, the scanning hi-res LIDAR is mounted at temporary or permanent fixed positions on land or sea.

What is claimed is:

1. A light detection and ranging (LIDAR) system comprising:
   a laser source configured to generate light signals; and
   a transceiver comprising:
      a plurality of transmission (TX) outputs through which light signals are transmitted into an environment, and
      a plurality of receive (RX) inputs through which a light beam is received from an object in the environment,
   wherein the transceiver is configured to:
      receive one or more local oscillator (LO) signals,
      transmit one or more light signals that are received from the laser source, into the environment through the plurality of TX outputs, receive, through the plurality of RX inputs, a first returned light and a second returned light reflected from one or more objects in the environment, output the first returned light and a first LO signal of the one or more LO signals to a plurality of first RX outputs, and output the second returned light and a second LO signal of the one or more LO signals to a plurality of second RX outputs, wherein the plurality of TX outputs and the plurality of RX inputs are located on a first side of the transceiver.

2. The LIDAR system of claim 1, wherein the plurality of TX outputs and the plurality of RX inputs are interleaved on the first side of the transceiver.

3. The LIDAR system of claim 1, further comprising:
a first detector to which the first returned light and the first LO signal are outputted.

4. The LIDAR system of claim 1, wherein the transceiver comprises:
a first semiconductor substrate including the plurality of TX outputs; and
a second semiconductor substrate including the plurality of RX inputs.

5. The LIDAR system of claim 4, wherein the first semiconductor substrate and the second semiconductor substrate are placed with a spacing that corresponds to a pitch of the plurality of TX outputs or a pitch of the plurality of RX inputs.

6. The LIDAR system of claim 1, wherein the transceiver comprises:
one or more LO inputs through which the one or more LO signals are provided to the transceiver; and
one or more TX inputs through which the one or more light signals are provided to the transceiver.

7. The LIDAR system of claim 6, wherein the one or more LO inputs, the one or more TX inputs, and the plurality of first RX outputs are located on a second side of the transceiver.

8. The LIDAR system of claim 1, further comprising:
a second detector to which the second returned light and the second LO signal are outputted.

9. The LIDAR system of claim 6, wherein the one or more LO inputs, the one or more TX inputs, the plurality of first RX outputs, and the plurality of second RX outputs are located on a second side of the transceiver.

10. The LIDAR system of claim 6, wherein the one or more LO inputs and the one or more TX inputs are located between (1) the plurality of first RX outputs and (2) the plurality of second RX outputs.

11. The LIDAR system of claim 1, further comprising:
a scanner configured to receive the one or more light signals transmitted from the plurality of TX outputs through a free space.

12. An autonomous vehicle control system comprising:
a light detection and ranging (LIDAR) system comprising:
a laser source configured to generate light signals; and
a transceiver comprising
a plurality of transmission (TX) outputs through which light signals are transmitted into an environment, and
a plurality of receive (RX) inputs through which a light beam is received from an object in the environment,
wherein the transceiver is configured to:
receive one or more local oscillator (LO) signals,
transmit one or more light signals that are received from the laser source, into the environment through the plurality of TX outputs,
receive, through the plurality of RX inputs, a first returned light and a second returned light reflected from one or more objects in the environment,
output the first returned light and a first LO signal of the one or more LO signals to a plurality of first RX outputs, and
output the second returned light and a second LO signal of the one or more LO signals to a plurality of second RX outputs,
wherein the plurality of TX outputs and the plurality of RX inputs are located on a first side of the transceiver; and
one or more processors configured to control operation of an autonomous vehicle using the first returned light and the first LO signal.

13. The autonomous vehicle control system of claim 12, wherein the plurality of TX outputs and the plurality of RX inputs are interleaved on the first side of the transceiver.

14. The autonomous vehicle control system of claim 12, wherein the transceiver comprises:
a first semiconductor substrate including the plurality of TX outputs; and
a second semiconductor substrate including the plurality of RX inputs.

15. The autonomous vehicle control system of claim 14, wherein the first semiconductor substrate and the second semiconductor substrate are placed with a spacing that corresponds to a pitch of the plurality of TX outputs or a pitch of the plurality of RX inputs.

16. The autonomous vehicle control system of claim 12, wherein the transceiver comprises:
one or more LO inputs through which the one or more LO signals are provided to the transceiver; and
one or more TX inputs through which the one or more light signals are provided to the transceiver.

17. The autonomous vehicle control system of claim 12, wherein the LIDAR system further comprises:
a first detector to which the first returned light and the first LO signal are outputted; and
a second detector to which the second returned light and the second LO signal are outputted.

18. The autonomous vehicle control system of claim 16, wherein the one or more LO inputs and the one or more TX inputs are located between (1) the plurality of first RX outputs and (2) the plurality of second RX outputs.

19. The autonomous vehicle control system of claim 16, wherein the one or more LO inputs, the one or more TX inputs, the plurality of first RX outputs, and the plurality of second RX outputs are located on a second side of the transceiver.

20. An autonomous vehicle comprising:
at least one of a steering system or a braking system; and
a light detection and ranging (LIDAR) system comprising:
a laser source configured to generate light signals; and
a transceiver comprising
a plurality of transmission (TX) outputs through which light signals are transmitted into an environment, and
a plurality of receive (RX) inputs through which a light beam is received from an object in the environment,
wherein the transceiver is configured to:
receive one or more local oscillator (LO) signals, transmit one or more light signals that are received from the laser source, into the environment through the plurality of TX outputs,
receive, through the plurality of RX inputs, a first returned light and a second returned light reflected from one or more objects in the environment,
output the first returned light and a first LO signal of the one or more LO signals to a plurality of first RX outputs, and
output the second returned light and a second LO signal of the one or more LO signals to a plurality of second RX outputs,
wherein the plurality of TX outputs and the plurality of RX inputs are located on a first side of the transceiver; and
one or more processors configured to control operation of the at least one of a steering system or a braking system using the first returned light and the first LO signal.

* * * * *